United States Patent [19]

Porritt et al.

[11] 4,096,057

[45] Jun. 20, 1978

[54] APPARATUS AND METHOD FOR RECOVERY OF BITUMINOUS PRODUCTS FROM TAR SANDS

[75] Inventors: Budge T. Porritt, Sandy, Utah; Lloyd A. Johanson, Ontario, Oreg.; Kenneth L. Noall, Ogden, Utah

[73] Assignee: New Energy Sources Company, Salt Lake City, Utah

[21] Appl. No.: 685,199

[22] Filed: May 10, 1976

[51] Int. Cl.$^2$ .......................... C10G 1/04; B01D 11/02
[52] U.S. Cl. ............................. 208/11 LE; 196/14.52; 241/20; 241/46.17; 241/74
[58] Field of Search ............... 208/11 LE; 196/14.52; 23/267 R, 267 E, 269, 270 R; 241/20, 74, 46.11, 46.17

[56] References Cited

U.S. PATENT DOCUMENTS

| 792,031 | 6/1905 | Herrick et al. | 241/46.17 |
|---|---|---|---|
| 2,855,156 | 10/1958 | Hochberg et al. | 241/46.17 |
| 2,873,026 | 2/1959 | Nienwenhuis et al. | 241/46.17 |
| 2,916,346 | 12/1959 | Jalkanen | 23/270 R |
| 2,927,007 | 3/1960 | Kaether | 23/270 R |
| 3,172,609 | 3/1965 | Olsen et al. | 241/74 |
| 3,352,500 | 11/1967 | Molls et al. | 241/74 |
| 3,392,105 | 7/1968 | Poettmann et al. | 208/11 LE |
| 3,556,980 | 1/1971 | Clark et al. | 208/11 LE |
| 3,560,371 | 2/1971 | Kaminsky | 208/11 LE |
| 3,605,975 | 9/1971 | Brimhall | 208/11 LE |
| 3,640,476 | 2/1972 | Engels | 241/74 |
| 3,784,464 | 1/1974 | Kaminsky | 208/11 LE |
| 3,844,490 | 10/1974 | Schold et al. | 241/74 |

FOREIGN PATENT DOCUMENTS

| 883,974 | 10/1971 | Canada | 208/11 LE |

*Primary Examiner*—Delbert E. Gantz
*Assistant Examiner*—James W. Hellwege
*Attorney, Agent, or Firm*—H. Ross Workman; J. Winslow Young

[57] ABSTRACT

An apparatus and method for (1) reducing agglomerated masses of tar sand and (2) recovering as a bituminous product the bituminous matrix material therefrom. The apparatus includes a vessel which is divided into an attrition zone enclosed by a screen member, a sand separation zone and a product recovery zone. The vessel accommodates liquid which is, advantageously, a solvent into which the agglomerated masses of tar sands are introduced. The liquid is impelled vigorously upwardly into the attrition zone to create a high shear environment by which the tar sand masses are reduced by attrition into sand particles coated with the bituminous matrix material of the tar sand. The separated grains of sand are also stripped of the bituminous product by the high shear environment. The cleansed sand passes through the screen member surrounding the attrition zone into the sand separation zone. The liquid and the bituminous product removed from the sand passes to the product recovery zone.

8 Claims, 1 Drawing Figure

APPARATUS AND METHOD FOR RECOVERY OF BITUMINOUS PRODUCTS FROM TAR SANDS

BACKGROUND

1. Field of the Invention

This invention relates to an apparatus and method for recovering bituminous products from tar sands.

2. The Prior Art

Tar sands are naturally occurring deposits which are generally constituted of bulk inorganic particles such as siliceous sands which are impregnated with a matrix of heavy petroleum or bitumen containing various types of hydrocarbons. Historically, the term tar sand was applied to these deposits because of their similarity in appearance to asphaltic compositions, although they have also been described variously as oil sands and bituminous sands.

Tar sand deposits are generally found in significantly large reserves such as those of the Athabasca tar sand deposits located near Ft. McMurray, Canada. Tar sand deposits are also found, for example, near Vernal, Green River, and Sunnyside, Utah. These tar sand deposits contain significant reserves of potentially recoverable bituminous products.

Various separation processes have been proposed for separating the bituminous products from the tar sand by treatment with (a) water, (b) water/surfactant mixtures, (c) solvents, (d) heat, and (e) combinations of the foregoing. Some of these processes are set forth in U.S. Pat. Nos. 1,497,607; 1,514,113; 2,871,180; 2,965,557; 3,161,581; 3,392,105; 3,553,099; 3,605,975; 3,847,789; 3,856,474; 3,875,046; 3,893,907. These references disclose processes which variously require some form of crushing, grinding or otherwise mechanically comminuting the agglomerated tar sands to a finely divided state in order to obtain a more thorough exposure of the bituminous matrix material to the action of the recovery technique. However, grinding or crushing is difficult and expensive because of the excessive equipment wear caused by the siliceous material which has a hardness greater than most components of the tar sand handling equipment. This feature is particularly important where tar sand is communited to relatively finely divided particles to increase exposure of the bituminous matrix to the recovery process.

It would therefore be an advancement in the art to provide a method and apparatus for disintegrating agglomerated masses of tar sand without subjecting the mechanical equipment to excessive wear. It would be another advancement in the art to provide an apparatus and method whereby advantage is taken of the abrasive nature of the tar sand masses to cause the tar sand masses to be suspended and agitated in a liquid to thereby reduce themselves to granules of sand to increase exposure of the bituminous products. It would be an even further advancement in the art to provide a liquid solvent and a high shear environment in the liquid whereby the bituminous matrix material is rapidly stripped from the granules of sand. Such an apparatus and method is disclosed herein.

BRIEF SUMMARY AND OBJECTS OF THE INVENTION

The present invention relates to an apparatus and method for recovering bituminous products from tar sands wherein an impellor is used to create a high shear environment in a liquid phase. The high shear environment causes the masses of tar sand to be rapidly reduced by attrition to sand particles and also rapidly strips the bituminous product from the finely divided detritus and sand resulting from this abradent action. The apparatus and method of this invention further includes means for separating the sand granules from the tar sand masses and also the bituminous product from the sand granules.

It is, therefore, a primary object of this invention to provide an improved apparatus for recovering bituminous products from tar sands.

Another object of this invention is to provide an improved apparatus for disintegrating agglomerated masses of tar sand into a detritus of individual grains of sand.

Another object of this invention is to provide an improved method for stripping bituminous products from the detritus of sand granules.

Another object of this invention is to provide an improved method for separating bituminous products from sand particles.

These and other objects and features of the present invention will become more fully apparent from the following description and appended claims taken in conjunction with the accompanying drawing.

BRIEF DESCRIPTION OF THE DRAWING

The FIGURE is a schematic illustration of one presently preferred embodiment of the apparatus of this invention shown in cross section to more clearly illustrate the claimed apparatus and method.

DETAILED DESCRIPTION OF THE PREFERRED EMBODIMENT

Figure 1:
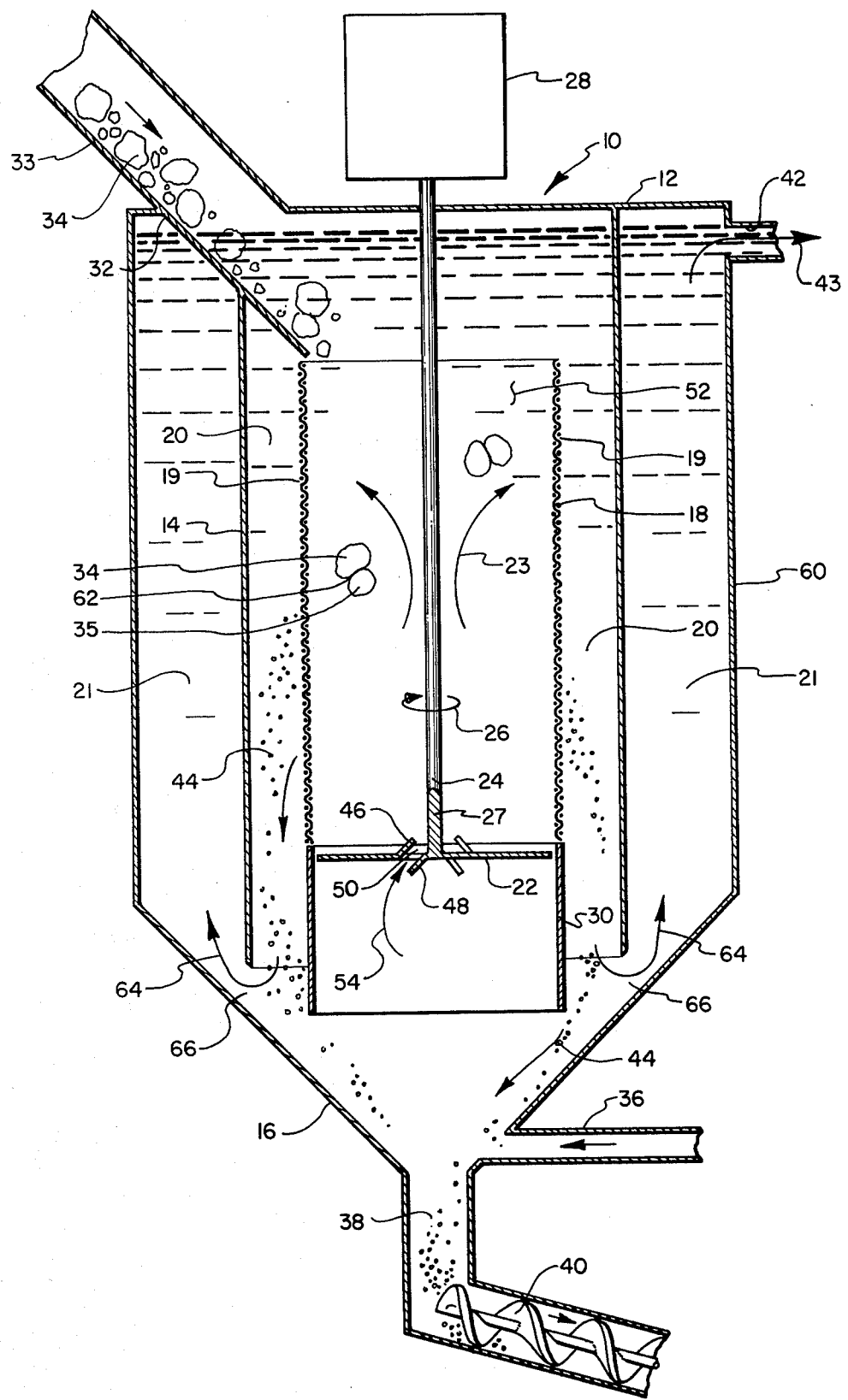

The apparatus of this presently preferred embodiment of the invention includes a vessel 10 which is configurated as a cylindrical, generally vertically oriented, vessel 10 having a cylindrical side wall 60 sealed at its upper end by a top 12. A sand collector 16 is configurated as a funnel having a convergent surface which extends downwardly from the lower periphery of side wall 60. Sand collector 16 terminates at its lower end in an outlet 38, the function of each of which will be discussed more fully hereinafter. Vessel 10 also includes an inlet chute 33 which passes through top 12 at 32 and further includes a liquid inlet 36 adjacent the bottom of sand collector 16 and a product/liquid outlet 42 adjacent top 12.

Interiorly, vessel 10 is separated into three serially concentric zones each of which are cylindrical and coaxial with vessel 10. These zones include an attrition zone 52, a sand separation zone 20 and a product recovery zone 21, the structure and function of each of which will be discussed more fully hereinafter. Attrition zone 52 is centrally disposed in vessel 10 and is formed as an open-top cylinder by a cylindrical screen member 18. The open end of attrition zone 52 is placed beneath the end of chute 33. Although illustrated as open ended, screen member 18 could be extended to contact with top 12 for additional structural strength, if desired. However, for ease of illustration and simplicity in construction, screen member 18 is shown herein as an open-top cylinder which outlines attrition zone 52.

The lower end of attrition zone 52 is transected by an impellor 22. A skirt 30 surrounds impellor 22 and depends downwardly from the lower periphery of screen member 18. Skirt 30 terminates prior to reaching sand collector 16 and forms a quiescent zone which also acts as a liquid reservoir for the impellor 22 as will be discussed more fully hereinafter.

Sand separation zone 20 is formed by a shroud 14 which encloses the annular space surrounding both screen member 18 and skirt 30. Shroud 14 depends downwardly from top 12 and terminates prior to reaching and collector 16. An annular opening 66 at the lower end of shroud 14 forms a passageway between sand separation zone 20 and product recovery zone 21.

Product recovery zone 21 is formed as the annular space between shroud 14 and cylindrical side wall 16. The product/liquid recovery outlet 42 is located at the upper end of product recovery zone 21.

The Attrition Zone

Attrition zone 52 is configured to receive masses of tar sand 34 and 35 from inlet chute 33. Only a few masses of tar sand are represented herein schematically at 34 and 35 for ease of illustration and understanding, although, clearly, attrition zone 52 will accommodate a greater number of tar sand masses than shown.

Tar sand masses 34 and 35 are introduced into chute 33 from a source (not shown) wherein they are subjected to an initial coarse screening process (not shown) to remove excessively large masses of tar sand which would possibly exceed the capabilities of attrition zone 52 and/or damage impellor 22 as will be discussed more fully hereinafter. In one experimental example, tar sand masses 34 and 35 having a diameter of approximately 2 inches were introduced into attrition zone 52 and were found to be adequately processed by the apparatus and method of this invention.

Impellor 22 is configured as a flat, circular disc which is mounted at its center on the lower end of a shaft 24. Shaft 24 extends upwardly through attrition zone 52 along the axis of vessel 10 and through top 12 where it is rotatably affixed to a motor 28. The direction of rotation of shaft 24 is indicated by arrow 26. Impellor 22 includes at least one radially extending slot 50 which is formed between an upwardly directed vane 46 and a downwardly directed scoop 48. Impellor 22 is shown herein in cross section to more clearly illustrate the relationship between vane 46, slot 50 and scoop 48. Preferentially, slot 50 extends radially outwardly from the shaft 24 and terminates prior to reaching the circumference of impellor 22 thereby providing a peripheral edge of metal (not shown) to impellor 22 at the end of shaft 50 for increased strength. Additional radial slots may also be included as part of the design of impellor 22, although only one is described herein for purposes of simplicity. Shaft 24 is also shown in partial cross section at 27 so as to more clearly illustrate the attachment of impellor 22 on the end of shaft 24. Importantly, impellor 22 is inexpensively fabricated from sheet metal stock so as to be readily replaceable when damaged or otherwise rendered unusable through wear.

Skirt 30 is also fabricated from sheet metal as a cylindrical surface which is open at both ends so as to inhibit downwardly falling sand particles 44 in sand separation zone 20 from being drawn into fluid 54 by impellor 22. Accordingly, skirt 22 provides a reservoir of relatively particle-free liquid for introduction into attrition zone 52 by impellor 22. Additionally, erosion of impellor 22 by contact with sand particles 44 is also thereby reduced significantly from what would otherwise occur if skirt 30 were removed and sand particles 44 were freely recirculated by impellor 22. Clearly, some fines and other lightweight sand particles 44 will tend to be recycled by impellor 22 through attrition zone 52 regardless of skirt 30. This recycling event is not believed to have an overall deleterious effect on the operation of apparatus 10.

Vessel 10 and, correspondingly, attrition zone 52 contain a liquid phase which is introduced through inlet 36. Rotation of impellor 22 by motor 28 causes the downwardly directed scoop 48 to force a column of liquid 54 upwardly through slot 50 into attrition zone 52. Additionally, vane 46 also pushes the liquid upwardly into attrition zone 52. Accordingly, impellor 22 creates a high shear environment in the liquid phase as indicated schematically at 23. Impellor speeds as high as 800 rpm or even higher, depending upon the size of the impellor 22 and other conventional structural and physical considerations, are found to provide a suitable high shear environment 23. Sufficient rotational speed is also maintained on impellor 22 so that fluid column 54 prevents masses of tar sand 34 and 35 from falling downwardly through slot 50.

High shear environment 23 suspends and vigorously agitates tar sand masses 34 and 35 causing abradent action therebetween as indicated schematically herein at 62. This mutual abradent action rapidly reduces tar sand masses 34 and 35 into sand particles 44 which are coated with the bituminous products that initially constituted the matrix material of the tar sand masses 34 and 35.

The high shear environment 23 also rapidly strips the bituminous products from the sane particles 44 and carries sand particles 44 outwardly where they escape through openings 19 in screen member 18 and pass into sand separation zone 20.

Clearly, a limited quantity of sand particles 44 and other fines (not shown) will also be carried over the upper periphery of screen member 18 by the upwelling liquid of high shear environment 23. However, this is believed to have very little detrimental effect since the carried-over sand particles will merely fall downwardly through sand separation zone 20 along with the sand particles 44 which pass through screen member 18.

Screen member 18 includes a plurality of openings 19 which permit the escape of sand particles 44 from attrition zone 52. In one presently preferred embodiment of the present invention, screen member 18 is inexpensively fabricated from one-half reinforcing bar material which has been formed as a closely-spaced coil. Spot welding or other similarly functioning spacers provide the appropriate spacing for openings 19 of approximately one-eighth inch. Fabrication of screen member 18 from reinforcing bar or similar material readily accommodates screen member 18 to function in the highly abrasive environment encountered as the side wall to attrition zone 52. This is of particular importance since high shear environment 23 vigorously agitates tar sand masses 34 and 35 causing them to strike screen member 18. This contact (not shown) also assists in the rapid attrition of tar sand masses 34 and 35 although the primary reduction of tar sand masses 34 and 35 is presently believed to occur in the high shear environment 23. Accordingly, screen member 18 is configured to (1) confine tar sand masses 34 and 35, (2) contribute to the abrasive reduction of tar sand masses 34 and 35, (3) permit the escape of sand particles 44 from attrition zone 52, and (4) inexpensively accommodate replacement, when necessary.

The upraised vane 46 of impellor 22 also contributes to the abradent action which reduces tar sand masses 34 and 35 by striking tar sand masses 34 and 35 which fall downwardly into contact therewith. Additionally, vane 46 pushes adjacent liquid, sand particles 44 and tar sand masses 34 and 35 upwardly into the high shear environment 23. Accordingly, there is a degree of mechanical contact between the solids and vane 46 which causes abrasion of vane 46. However, it has also been found that the liquid phase also acts as a cushion and a lubricant for this contact thereby diminishing adverse effects on vane 46.

The liquid found to be useful in the apparatus and method of this invention includes such liquids as solvents for the bituminous product including, among others, kerosene, gasoline, etc., water/surfactant mixtures, and mixtures of these liquids. Elevated temperatures in the liquid phase have also been found to accelerate the attrition and stripping action by the liquid by increasing the rate at which the bituminous products are removed by the liquid phase.

Preferentially, the liquid phase should be of sufficient density so as to impart the necessary momentum to tar sand masses 34 and 35 and provide the high shear environment 23 with its resultant abradent action 62 between tar sand masses 34 and 35. However, it is presently believed that an excessive viscosity of the liquid phase would result in a decreased tendency for the sand particles 44 to be stripped of their bituminous products since there would be a lowering of the tendency to form the high shear environment 23.

Attrition zone 52 thereby serves to (1) reduce the masses of tar sand 34 and 35 through self-attrition into discrete particles of sand 44, (2) increase exposure of the bituminous matrix material of the tar sand to the recovery action of the liquid phase, (3) separate the sand particles 44 from the tar sand masses 34 and 35 by carrying sand particles 44 onto sand separation zone 20, and (4) reduce crushing and grinding requirements of tar sand masses 34 and 35.

Sand Separation Zone

Sand separation zone 20 serves as a quiescent zone filled with liquid through which sand particles 44 fall and are further stripped of bituminous products. The falling sand 44 strikes the sloped surface of funnel 16 where it is directed to outlet 38.

It has been found that sand 44 has an angle of repose of about 60° from the horizontal. This means that for surface slopes less than about 60° the sand 44 will tend to accumulate where it has fallen. Surface slopes greater than about 60° will exceed the angle of repose for sand 44 so that it will continue its downward progression along the surface of funnel 16 into outlet 38. Accordingly, in this presently preferred embodiment of the invention, sand collector 16 is configured with a slope of at least 60° or greater so as to be greater than the angle of repose of sand 44. Advantageously, liquid inlet 36 is located adjacent sand outlet 38 so that sand 44 passes through fresh liquid being introduced into vessel 10. Accordingly, the final stage of stripping sand 44 in sand collector 16 is accomplished with fresh liquid entering inlet 36. This final stripping action is enhanced by the general countercurrent nature of the operation of vessel 10 and the concentration gradient where the liquid is a solvent for the residual bituminous product on sand 44.

An auger 40 is connected to outlet 38 to remove sand 44 from vessel 10. Clearly, other conventional removal apparatus could also be used in place of auger 40.

Product Recovery Zone

Product recovery zone 21 in this presently preferred embodiment of the invention is the annular space between shroud 14 and side wall 60 and, accordingly, has a greater cross sectional area than sand recovery zone 20. The lower end of shroud 14 terminates before reaching the surface of sand collector 16. An opening 66 is thereby provided between sand separation zone 20 and product recovery zone 21. The flow of combined bituminous product/liquid mixture is indicated schematically at arrow 64 as it passes from sand separation zone 20 into product recovery zone 21 through the opening 66. Product recovery zone 21 thereby serves as a setting chamber to assist in the removal of any additional fines (not shown) which may be carried out with product-/liquid 64. It should be particularly noted that the inwardly sloped surface of sand collector 16 extends across product recovery zone 21 to side wall 60. Settling fines (not shown) will, accordingly, be directed thereby toward outlet 38 along with sand 44.

Opening 66 may be configured as an open passageway formed through 360° (as shown) or as a plurality of openings at the bottom of shroud 14. However, it is presently believed that the present 360° opening of opening 66 is the preferable design since there are no pillars or other such obstructions between shroud 14 and sand collector 16 which would tend to block the free passage of settling particles along to surface of sand collector 16 to outlet 38.

The recovered material which includes bituminous product/liquid mixture 43 plus small quantities of unsettled fines is removed from product recovery zone 21 through the upwardly located product outlet 42. Product/liquid mixture 43 is directed to suitable processing apparatus (not shown) whereby, preferentially, the liquid may be separated therefrom and recycled into apparatus 10 through inlet 36.

The apparatus and method of this invention thereby provides significant improvements in that it accommodates the rapid attrition of agglomerated masses of tar sand into a finely divided detritus consisting of bituminous products and sand granules. The increased surface area of the finely divided detritus increases the exposure of the bituminous products to the recovery action of the liquid. The apparatus further provides improvements in the separation of sand particles from the product/liquid.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a United States Letters Patent is:

1. A method for separating bituminous products from tar sands wherein the tar sands are formed from granules agglomerated by bitumen, the method comprising the steps of:
   obtaining a vessel;
   preparing an attrition zone in the vessel by placing a cylindrical screen member in the vessel, the screen being suspended a discrete distance from the walls of the vessel;

obstructing a substantial portion of the lower end of the attrition zone with an impellor;

introducing a liquid into the vessel;

imparting an upward velocity to the liquid by rotating the impellor;

introducing chunks of tar sand into the attrition zone;

reducing the chunks of tar sand into granules by abrading the chunks against adjacent chunks in the liquid through the upward velocity of the liquid;

confining the chunks of tar sand to the attrition zone by the cylindrical screen member;

removing the granules from the attrition zone through the cylindrical screen member surrounding the attrition zone;

directing the removed granules downwardly through the space between the screen and the vessel walls;

inhibiting the downwardly directed granules from being drawn into the impellor by surrounding the impellor with a cylindrical skirt extending downwardly from the cylindrical screen member;

removing the agglomerating bituminous products from the chunks and granules with the liquid during the preceding reducing, confining, removing, and directing steps; and separating the removed bituminous products by directing the liquid and bituminous products from the vessel.

2. The method defined in claim 1 wherein the liquid comprises a liquid from the group consisting of water, a solvent for the bituminous product, a mixture of water and solvent, and a water/surfactant mixture.

3. A method for removing bituminous products from tar sand comprising the steps of:

obtaining tar sand materials wherein a bituminous product binds sand grains into agglomerated chunks of tar sand;

preparing a solvent for the bituminous product;

placing the solvent and the tar sand chunks into a vessel;

confining the chunks in an attrition zone in the vessel by surrounding the attrition zone with a cylindrical screen member, the cylindrical screen member being spaced from the walls of the vessel;

vigorously agitating the tar sand chunks in the solvent in the attrition zone so as to abrade chunks against adjacent chunks thereby causing the chunks to disintegrate into grains of sand thereby increasing exposure of the bituminous products to the solvent while removing sand from the attrition zone by passing the sand outwardly through the cylindrical screen member toward the bottom of the vessel; and removing bituminous products by dissolving the bituminous products with the solvent.

4. An appatratus for disintegrating agglomerated masses of tar sand comprising:

a vessel;

a cylindrical screen member in the vessel and spaced from the wall of the vessel thereby defining a side wall of an attrition zone in the vessel, the screen member confining the tar sand masses while permitting egress of sand from the attrition zone through the screen member into the space between the screen member and the walls of the vessel;

means for introducing agglomerated masses of tar sand into the attrition zone;

means for introducing a liquid into the vessel;

means for suspending and agitating the tar sand masses in the liquid in the attrition zone to cause disintegration of the tar sand masses into sand, said means for suspending and agitating the tar sand masses comprising an impellor transecting the attrition zone at the lower end of the cylindrical screen member, the impellor rotatably attached to a motor, the motor rotating the impellor to impel the liquid upwardly and thereby imparting a vigorous upward velocity to the liquid; and means for inhibiting sand which has passed from the attrition zone through the screen member from being drawn into the impellor, said means comprising a cylindrical skirt depending downwardly from the lower periphery of the cylindrical screen member and in spaced relation to the vessel wall.

5. An apparatus for removing bituminous products from granular siliceous material wherein the granular siliceous material is agglomerated into discrete masses by the bituminous products comprising:

a vessel;

a cylindrical screen member in the vessel and spaced from the wall of the vessel thereby defining a side wall of an attrition zone, the screen member having openings therethrough thereby accommodating passage of granules of siliceous material while confining the masses in the attrition zone;

means for introducing a liquid into the vessel;

means for introducing discrete masses of agglomerated siliceous material into the attrition zone;

means for creating a shear environment in the liquid in the attrition zone for reducing the masses to discrete granules by causing the masses to abrade against adjacent masses while simultaneously stripping bituminous product from the granules, said means for creating a shear environment comprising an impellor rotatably attached to a motor, the impellor being configured as a circular disk having radial slots therein and with an radially extending flanges thereon, the impellor being located adjacent the lower end of the cylindrical screen member thereby transecting the lower end of the attrition zone;

means for separating the granules from the masses, said means comprising the cylindrical screen member and a cylindrical skirt depending downwardly from the lower periphery of the cylindrical screen member and spaced from the walls of the vessel, the skirt inhibiting granules from being drawn into the liquid of the high shear environment in the attrition zone; and means for defining a sand separation zone as an annular space surrounding the cylindrical screen member comprising a shroud in spaced relation between the cylindrical screen member and the vessel wall.

6. An apparatus as defined in claim 5 wherein the vessel comprises a vertically oriented cylindrical vessel having downwardly tapered lower end.

7. An apparatus for reducing agglomerated masses of tar sand and stripping bituminous product from the sand comprising:

a vessel;

a cylindrical screen member in the vessel, the cylindrical screen member having no bottom thereto and spaced from the wall of the vessel thereby defining a side wall of an attrition zone in the vessel;

a cylindrical skirt member coextensive with the cylindrical screen member and depending downwardly from the lower periphery of the cylindrical screen member in spaced relationship to the vessel wall;

a disk-like impellor transecting the lower end of the attrition zone at the juncture of the cylindrical screen member and the cylindrical skirt member;

a downwardly depending shroud in the vessel, said shroud forming a sand separation zone, and a product recovery zone, said sand separation zone comprising a first annular space surrounding the attrition zone and the cylindrical skirt member, the sand separation zone opening downwardly to permit sand to fall therefrom into a sand collection zone in the bottom of the vessel said shroud also being oriented in spaced relationship to the vessel wall thereby forming said product recovery zone as a second annular space between the shroud and the vessel wall the second annular space opening downwardly by the shroud being suspended above the bottom of the vessel;

means for introducing a fluid into the vessel;

meams for rotating the impellor to impart a vigorous upward velocity to the fluid into the attrition zone;

means for introducing tar sand into the attrition zone, the fluid suspending and agitating the tar sand to reduce the same to sand while stripping bituminous product from the sand and ejecting sand outwardly through the screen member into the sand separation zone;

sand removal means for removing sand from the vessel comprising a downwardly sloped surface below the sand separation zone, the sloped surface leading to an outlet; and separating means for separating bituminous product from the sand comprising the shroud and the opening adjacent the lower end of the shroud through which the bituminous product passes while the shroud directs the sand downwardly toward the sloped surface.

8. An apparatus for reducing discrete masses of tar sand by attrition comprising:

a vessel;

a vertically oriented cylindrical screen member suspended in spaced relationship to the walls of the vessel thereby forming a wall of an attrition zone in the vessel;

an impellor comprising a circular disc rotatably mounted upon a motor means, the impellor transecting the lower end of the attrition zone to close off the open bottom end of the attrition zone to assist in retaining masses of tar sand in the attrition zone, the impellor having at least one slot extending outwardly from the center of the disc, the slot being formed between a downwardly directed scoop and an upwardly directed vane;

an impellor shroud comprising a cylindrical skirt depending downwardly from the cylindrical screen member and in spaced relation to the vessel walls, the cylindrical skirt being nonperforate to inhibit sand from being drawn into the impellor;

means for introducing a liquid into the attrition zone; and means for introducing discrete masses of tar sand into the liquid in the attrition zone, the impellor being rotated at sufficient velocity to cause a vigorous upwelling of the liquid and the resultant size reduction of the tar sand masses by attrition.

* * * * *